No. 858,338. PATENTED JUNE 25, 1907.
J. GARCIA.
FIBER CLEANING MACHINE.
APPLICATION FILED JUNE 4, 1906.

3 SHEETS—SHEET 1.

WITNESSES
S. Herzog
Rob: Schwarz

INVENTOR
J. Garcia
BY J. O. Fowler
his ATTORNEY

No. 858,338. PATENTED JUNE 25, 1907.
J. GARCIA.
FIBER CLEANING MACHINE.
APPLICATION FILED JUNE 4, 1906.

3 SHEETS—SHEET 2.

No. 858,338. PATENTED JUNE 25, 1907.
J. GARCIA.
FIBER CLEANING MACHINE.
APPLICATION FILED JUNE 4, 1906.
3 SHEETS—SHEET 3.
Fig. 3
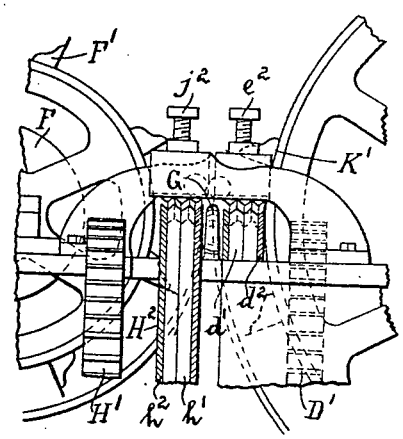
Fig. 4 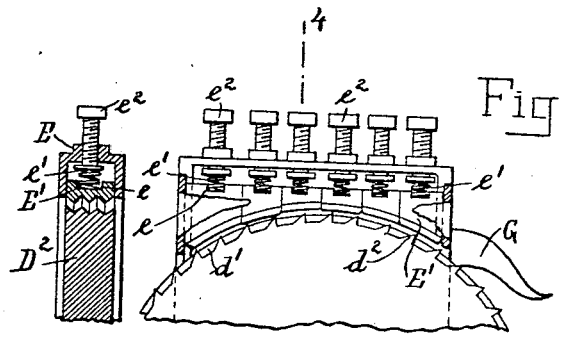 Fig. 5
WITNESSES
S. Herzog
Rob. Schwarz
INVENTOR
J. Garcia
BY J. O. Fowler
his ATTORNEY

UNITED STATES PATENT OFFICE.

JOSEPH GARCIA, OF BROOKLYN, NEW YORK.

FIBER-CLEANING MACHINE.

No. 858,338. Specification of Letters Patent. Patented June 25, 1907.

Original application filed May 27, 1904, Serial No. 210,055. Divided and this application filed June 4, 1906. Serial No. 320,210.

*To all whom it may concern:*

Be it known that I, JOSEPH GARCIA, a citizen of the United States of America, and a resident of Brooklyn, in the county of Kings and State of New York, have invented a certain new and useful Fiber-Cleaning Machine, of which the following is a specification, the same being a full, clear, and exact description of the invention, such as will enable those skilled in the art to which it appertains to make and use the same.

This invention relates to an apparatus for separating the filamentous substance from the long leaf agaves, and in particular henequen, sacqui or sisal hemp, and other similar long fiber producing plants, and it has for its object the provision of an apparatus of the kind set forth comparatively simple in construction, inexpensive to manufacture and which operates smoothly and efficiently in practical use.

To attain the desired end, this, my invention, consists in novel devices and combinations of devices hereinafter described.

Figure 1:
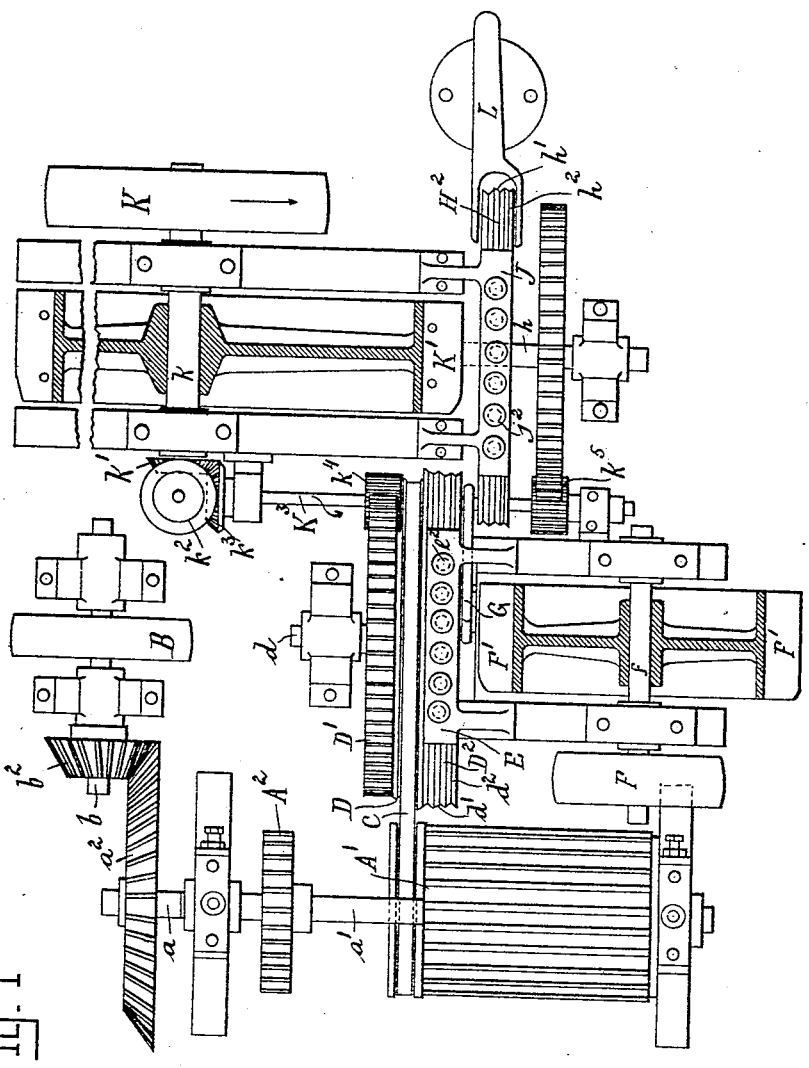
Figure 2:
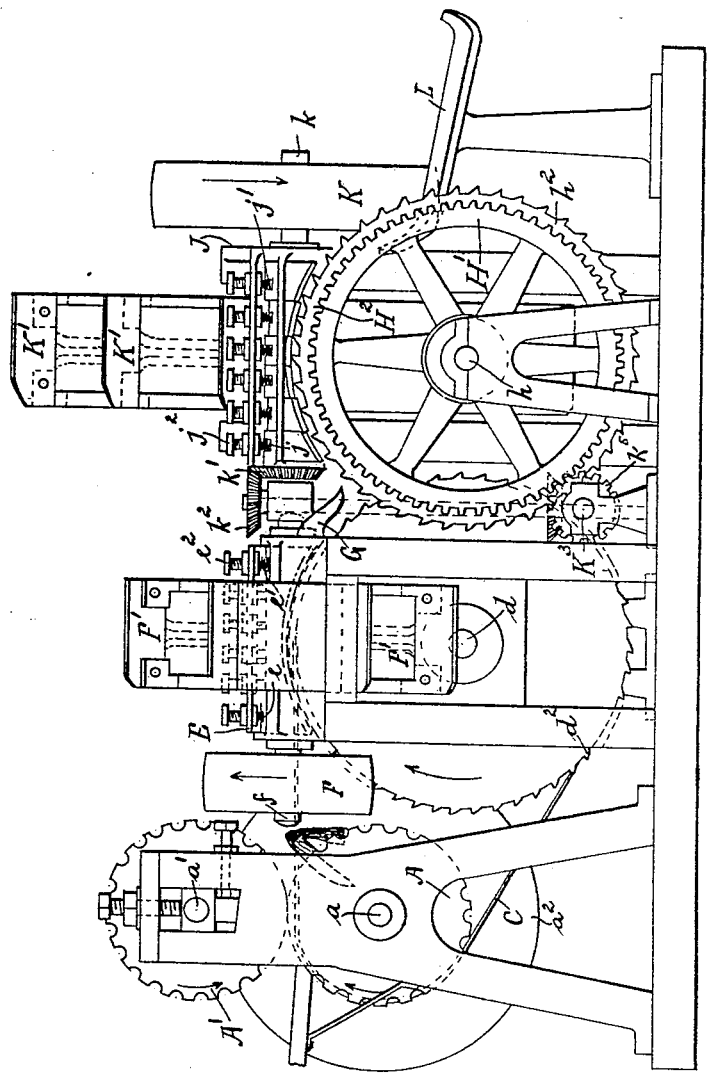

In order to enable my invention to be fully understood, I will proceed to explain the same by reference to the drawings which accompany and form a part of this specification, in which Figure 1 represents a plan view of a fiber cleaning machine constructed according to my invention, the feed table shown in Fig. 2 being omitted; Fig. 2 is a side elevation of the same, and Figs. 3, 4 and 5 are views in detail of my gripping device.

Like letters of reference indicate like parts in all views.

I have found it desirable to make an apparatus by the use of which the following operations may be combined in and automatically performed by a single machine, namely;—first, the plants are crushed so that the stalks and leaves shall be of a practically uniform thickness in order to secure economy of power in operating the machine; second, the plants are carried through the machine and supported loosely by a suitable conveying means; third, the middle of the plants is caught by a positively acting, holding, or gripping device while one end (nearly one half of the whole length) of the plants is decorticated or cleaned; fourth, the plants are moved transversely a short distance as regards the second cleaning mechanism by the gripping device, fifth, the cleaned or extracted fibers are caught by another positively acting gripping device, while the remaining part of the plants (being ordinarily a little more than one half of the length) is cleaned by the scraping wheel; and, finally, the cleaned fibers are discharged upon a suitable holding device; and I have, therefore, constructed according to my invention an apparatus of the class described, embodying the preferred construction of parts, and their mutual relationship, combination, arrangement and organization in a composite body or structure, as hereinafter described.

Referring particularly to the drawings, A, $A^1$, denote my crushing rollers located at the end of a feeding table and preferably bearing corrugated faces and supported by shafts $a$, $a^1$. The rollers A, $A^1$ are ordinarily made of a length equal to about one half of the length of the leaves to be treated, the thinner ends of the said leaves being fed between the gears $A^2$ also carried by the said shafts $a$, $a^1$. The shaft $a$, is also provided with a bevel gear $a^2$, which meshes into the bevel gear $b^2$ carried by the shaft $b$ which is rotated by means of a pulley B.

The crushing roller A is ordinarily somewhat longer than the roller $A^1$ and carries in a peripheral groove a belt C which encircles the same and also the pulley D which with the gear $D^1$, together with the grip-wheel $D^2$, are rigidly mounted upon the shaft $d$. The belt C serves as a carrier or conveying means to receive the leaves after the same leave the feed table and to carry the same to the grip wheel $D^2$. The grip wheel $D^2$ is formed with peripheral longitudinal grooves or corrugations $d^1$, and has preferably located at the edges thereof, serrations $d^2$. Superimposed on the toothed grip wheel or wheel carrier, $D^2$ for moving the plant, and constructed and arranged to coact therewith, are a series of yielding blocks $E^1$ or platens approximately conforming in contour with and presenting a practically continuous surface to the carrier and forming each a segment of an arc whose center is the same as that of said wheel and supported in a frame E, the lower faces of the blocks being corrugated or grooved to register with the corrugations $d^1$ on the wheel $D^2$. Recesses $e$ are formed in the said blocks to contain springs $e^1$, by means of which said springs $e^1$ and the controlling screws $e^2$ which work in the frame E, a predetermined pressure may be applied individually to the blocks E¹, the said elastic means thus serving to hold the said blocks into approximate contact with the wheel with an increased or decreased elastic pressure at will.

The cleaning or scraping wheel F¹ carries scrapers and knives of the ordinary description and serves in connection with the adjacent ordinary plate or shoe to clean the thicker end of the leaves, which, as stated, are supported by the grip wheel and the blocks. The cleaning or beating wheel F¹ is mounted on the shaft $f$, which is rotated by the pulley F. As the leaves are moved forward by the grip wheel D², and while still held between the said grip wheel and the blocks E¹, the cleaned fibers will pass over on to the horizontal top portion of the plate G.

Any given point at the highest part of the grip wheel D² lies adjacent to the top of the horizontal portion of the plate G which extends under the cleaned fibers. But as that point on the periphery of the grip wheel descends in the course of the revolution of the said wheel, it will gradually move away from the top of the plate G and the distance between the two will be constantly increased. Consequently by the time that the leaves pass away from between the grip wheel D² and the blocks D¹, the fibers will be moved transversely across the plate G until the part of the cleaned fibers that rest upon the said plate G will be quite a distance from the uncleaned part of the leaves just being released from the gripping device. That is to say, the point at which the leaves are supported is moved transversely as regards the said leaves by the action of the gripping device. The series of yielding blocks E¹ allow for the inequalities of the thickness of the leaves. At the time the leaves emerge from between the grip wheel D² and the blocks E¹ they will pass down the depending hook or prong at the end of the plate G and the cleaned portion of the same will be caught between the grip wheel H² and the yielding blocks J¹. The grip wheel H² has peripheral corrugations $h^1$ and serrations $h^2$ at the edges thereof, and the superimposed blocks J¹ are held in a frame J and are formed with recesses $j$ in which are located springs $j^1$ the tension of which may be adjusted by the screws $j^2$ which work in the frame J, and the said blocks are also formed with corrugations to register with the corrugations of the grip wheel H². When the remaining portions of the leaves have been cleaned by the scraper K¹ the leaves are released by the grip wheel H² and blocks J¹ and the same are deposited upon a suitable holding means as the hook L. The scraper K¹ carries suitable knives and scrapers and is mounted on a shaft $k$ which is rotated by the pulley K. At the end of this shaft is located a bevel gear $k^1$ which meshes with the bevel gear $k^2$ mounted on a vertical shaft and provided at its lower end with another bevel gear which meshes with the bevel gear $k^3$ on the shaft K³. The latter shaft carries gears $k^4$ and $k^5$ which respectively rotate the gears D¹ and H¹.

It will be observed that the series of blocks E¹ or J¹ constitute flexible platens. These blocks form with respect to the wheels D² or H² a series of superimposed differential devices each constructed and arranged to yield respectively a greater or less degree and to move away from the periphery of the wheel a distance according to the thickness of the leaves to be treated; which blocks coact with and work in the plane of the said wheel. The second gripping device receives the leaves directly from the first gripping mechanism, the said first gripping device being constructed and arranged to deliver the cleaned portions of the leaves to the second gripping device a little to one side of the path previously followed by the leaves. This change of the position of the leaves is caused by means located adjacent to the first gripping device, in the present embodiment consisting of an arm or plate G, which causes parts of the leaves to be drawn away from the plane of the second gripping device. It will be also observed that the blocks or platens E¹ or J¹ form in connection with the movable carriers D² or H² a co-operating means which is elastically held in approximate contact and sliding engagement with the said movable carrier so as to be differentially or separately yieldable at different points of the carrier, whereby plants of varying thicknesses may be grasped and rigidly held between the said carrier and co-operating means.

I only claim in this application the specific construction of the platen or co-operating means composed of a plurality of individually and independently acting elastic parts or sections the adjacent ends of some of the various pairs of sections lying on one side of the cleaning wheel, and others being located directly in front of, or between the vertical planes of the faces or edges of, one edge or face of one edge or face of the cleaning or beating wheel which ends ordinarily engage each other with a friction movement, the said parts or sections lying above the plant carrier or conveyer (as the carrier wheel shown) and being relatively or respectively or individually yieldable in a vertical direction; and the said parts or sections being rounded off at the lower part of one end adjacent to the carrier, the other corner being preferably angular as the other features of the invention, together with the general combination of the parts, are claimed in the application filed by me on May 27, 1904, Serial No. 210,055, of which this is a division.

As it is evident that many changes in the construction, form, proportion, and relative arrangement of parts might be resorted to without departing from the spirit and scope of my invention, I would have it understood that I do not restrict myself to the particular construction and arrangement of parts shown and described, but that such changes and equivalents may be substituted therefor, and that,

What I claim as my invention is:—

1. In a fiber cleaning machine, a leaf cleaning or beating device, a rotary wheel carrier or leaf conveyer located in front of the same, and a platen superimposed on, and constructed and arranged to present a practically continuous surface to the said wheel, and consisting of a plurality of sections having a division therebetween and forming each a segment of an arc whose center is the same as that of said wheel, the carrier or conveyer and platen being relatively movable, and the said parts or sections having a differential or separate movement or action at said division.

2. In a fiber cleaning machine, a leaf cleaning or beating device, a carrier or leaf conveyer located in front of the same, and co-operating means superimposed upon, and constructed and arranged to approximately conform in contour with, and to present a practically continuous bearing surface to the carrier or conveyer, and consisting of a plurality of parts or sections having a division therebetween, the carrier or conveyer and co-operating means being relatively movable, and the said parts or sections having a differential or separate vertical movement or action at said division.

3. In a fiber cleaning machine, a leaf cleaning or beating device, a wheel carrier or leaf conveyer located in front of the same and adapted to carry the leaves on its upper face, and co-operating means superimposed on and held downward on the carrier in sliding engagement therewith, to press the leaves in contact with the carrier, and constructed and arranged to approximately conform in contour with and to present a practically continuous surface to and to coact with and to work in the same plane as the carrier or conveyer, and consisting of a plurality of parts or sections, having a division therebetween, the carrier or conveyer and co-operating means being relatively movable and the said parts or sections having a differential or separate movement or action at said division.

4. In a fiber cleaning machine, a leaf cleaning or beating device, a carrier or leaf conveyer located in front of the same and adapted to carry the leaves on its upper face, and co-operating means superimposed on and held downward on the carrier in sliding engagement therewith, to press the leaves in contact with the carrier, and constructed and arranged to approximately conform in contour with and to present a practically continuous surface to and to coact with and to work in the same plane as the carrier or conveyer, and consisting of a plurality of parts or sections having a division therebetween, the carrier or conveyer and co-operating means being relatively movable and the said parts or sections having a differential or separate movement or action at said division, in combination with elastic means for pressing the co-operating means toward the carrier or conveyer.

5. In a fiber cleaning machine, a leaf cleaning or beating device, a carrier or leaf conveyer located in front of the same and adapted to carry the leaves on its upper face, and co-operating means superimposed on and held downward on the carrier in sliding engagement therewith, to press the leaves in contact with the carrier, and constructed and arranged to approximately conform in contour with and to present a practically continuous surface to and to coact with and to work in the same plane as the carrier or conveyer, and consisting of a plurality of parts or sections having a division therebetween, the carrier or conveyer and co-operating means being relatively movable and the said parts or sections having a differential or separate movement or action at said division, in combination with elastic means for pressing the co-operating means toward the carrier or conveyer, and means for increasing or decreasing such elastic pressure.

6. In a fiber cleaning machine, a leaf cleaning or beating device, a rotary wheel carrier or leaf conveyer located in front of the same, and a platen consisting of a plurality of sections forming each a segment of an arc whose center is the same as that of the said wheel, and having a division between the sections located directly in front of or within the vertical planes of the faces or edges of the cleaning or beating device, the carrier or conveyer and platen being relatively movable, and the said parts or sections having a differential or separate movement or action at said division.

7. In a fiber cleaning machine, a leaf cleaning or beating device, a carrier or leaf conveyer located in front of the same and adapted to carry the leaves on its upper face, and co-operating means superimposed on and held downward on the carrier in sliding engagement therewith, to press the leaves in contact with the carrier, and constructed and arranged to approximately conform in contour with and to present a practically continuous surface to and to coact with and to work in the same plane as the carrier or conveyer, and consisting of a plurality of parts or sections having a division therebetween located directly in front of, or within the vertical planes of the faces or edges of, the cleaning or beating device, the carrier or conveyer and co-operating means being relatively movable, and the said parts or sections having a differential or separate vertical movement or action at said division.

8. In a fiber cleaning machine, a leaf cleaning or beating device, a carrier or leaf conveyer located in front of the same and adapted to carry the leaves on its upper face, and co-operating means superimposed on and held downward on the carrier in sliding engagement therewith, to press the leaves in contact with the carrier, and constructed and arranged to approximately conform in contour with and to present a practically continuous surface to and to coact with and to work in the same plane as the carrier or conveyer, and consisting of a plurality of parts or sections having a division therebetween located directly in front of, or within the vertical planes of the faces or edges of, the cleaning or beating device, the carrier or conveyer and co-operating means being relatively movable, and the said parts or sections having a differential or separate vertical movement or action at said division, in combination with elastic means for pressing the co-operating means toward the carrier or conveyer.

9. In a fiber cleaning machine, a leaf cleaning or beating device, a carrier or leaf conveyer located in front of the same and adapted to carry the leaves on its upper face, and co-operating means superimposed on and held downward on the carrier in sliding engagement therewith, to press the leaves in contact with the carrier, and constructed and arranged to approximately conform in contour with and to present a practically continuous surface to and to coact with and to work in the same plane as the carrier or conveyer, and consisting of a plurality of parts or sections having a division therebetween located directly in front of, or within the vertical planes of the faces or edges of, the cleaning or beating device, the carrier or conveyer and co-operating means being relatively movable, and the said parts or sections having a differential or separate vertical movement or action at said division, in combination with elastic means for pressing the co-operating means toward the carrier or conveyer, and means for increasing or decreasing such elastic pressure.

10. In a fiber cleaning machine, a leaf cleaning or beating device, a rotary carrier or leaf conveyer located in front of the same and adapted to carry the leaves on its upper face, and non-rotative co-operating means superimposed on and held downward on the carrier in sliding engagement therewith, to press the leaves in contact with the carrier, and constructed and arranged to approximately conform in contour with and to work in the same plane as the carrier or conveyer, and consisting of a plurality of parts or sections having a division therebetween located directly in front of, or within the vertical planes of the faces or edges of, the cleaning or beating device, and the said parts or sections having a differential movement or action at said division.

11. In a fiber cleaning machine, a leaf cleaning or beating device, a rotary wheel carrier or leaf conveyer located in front of the same, and a platen consisting of a plurality of sections forming each a segment of an arc whose center is the same as that of the said wheel, the adjacent ends of two sections being constructed and arranged to engage each other with a friction movement and to work with a differential movement or action.

12. In a fiber cleaning machine, a leaf cleaning or beating device, a carrier or leaf conveyer located in front of the same, and co-operating means superimposed on the carrier or conveyer and consisting of a plurality of parts or sections, the adjacent ends of two sections being constructed and arranged to engage each other with a friction movement, and to work with a differential movement or action.

13. In a fiber cleaning machine, a leaf cleaning or beating device, a carrier or leaf conveyer located in front of the same, and co-operating means superimposed on the carrier or conveyer and consisting of a plurality of parts or sections, the adjacent ends of two sections being constructed and arranged to engage each other with a friction movement, and to work with a differential movement or action, in combination with elastic means for pressing the co-operating means toward the carrier or conveyer.

14. In a fiber cleaning machine, a leaf cleaning or beating device, a carrier or leaf conveyer located in front of the same, and co-operating means superimposed on the carrier or conveyer and consisting of a plurality of parts or sections, the adjacent ends of two sections being constructed and arranged to engage each other with a friction movement, and to work with a differential movement or action, in combination with elastic means for pressing the co-operating means toward the carrier or conveyer, and means for increasing or decreasing such elastic pressure.

15. In a fiber cleaning machine, a leaf cleaning or beating device, a carrier or leaf conveyer located in front of the same, and co-operating means superimposed on the carrier or conveyer and consisting of a plurality of parts or sections, the adjacent ends of two sections being located directly in front of or within the vertical planes of the edges or faces of the cleaning or beating device, said ends being constructed and arranged to engage each other with a friction movement, and to work with a differential movement or action.

16. In a fiber cleaning machine, a leaf cleaning or beating device, a carrier or leaf conveyer located in front of the same, co-operating means superimposed on the carrier or conveyer and consisting of a plurality of parts or sections, the adjacent ends of two sections being located directly in front of or in the vertical planes of the edges or faces of the cleaning or beating device, said ends being constructed and arranged to engage each other with a friction movement, and elastic means located adjacent to each part or section for pressing the same toward the carrier or conveyer.

17. In a fiber cleaning machine, a leaf cleaning or beating device, a carrier or leaf conveyer located in front of the same, co-operating means superimposed on the carrier or conveyer and consisting of a plurality of parts or sections, the adjacent ends of two sections being located directly in front of or in the vertical planes of the edges or faces of the cleaning or beating device, said ends being constructed and arranged to engage each other with a friction movement, and elastic means located adjacent to each part or section for pressing the same toward the carrier or conveyer, and means for increasing or decreasing such elastic pressure.

18. In a fiber cleaning machine, a leaf cleaning or beating device, a rotary wheel carrier or leaf conveyer located in front of the same, and a platen consisting of a plurality of sections forming each a segment of an arc whose center is the same as that of the said wheel, and having a division between the sections located directly in front of or in the vertical planes of the edges or faces of the cleaning or beating device, the said section ends being constructed and arranged to engage each other with a friction movement.

19. In a fiber cleaning machine, a leaf cleaning or beating device, a rotary wheel carrier or leaf conveyer located in front of the same, and a platen consisting of a plurality of non-rotative parts or sections, forming each a segment of an arc whose center is the same as that of said wheel, the carrier or conveyer and platen being relatively movable, and the said parts or sections being each rounded off at the lower part of one corner or edge adjacent to the carrier.

20. In a fiber cleaning machine, a leaf cleaning or beating device, a carrier or leaf conveyer located in front of the same and adapted to carry the leaves on its upper face, and co-operating means superimposed on and held downward on the carrier in sliding engagement therewith, to press the leaves in contact with the carrier or conveyer, and consisting of a plurality of non-rotative sections, the co-operating means and the carrier being relatively movable, and the said sections being each rounded off at the lower part of one corner or end adjacent to the carrier, the other corner of the sections being angular in contour, the said sections being constructed and arranged to be respectively moved away from the carrier a greater or less distance according to the thickness of a leaf by the passage thereunder of the said leaf.

21. In a fiber cleaning machine, a leaf cleaning or beating device, a carrier or leaf conveyer located in front of the same and adapted to carry the leaves on its upper face, and co-operating means superimposed on and held downward on the carrier in sliding engagement therewith, to press the leaves in contact with the carrier or conveyer, and consisting of a plurality of non-rotative sections, the co-operating means and the carrier being relatively movable, and the said sections being each rounded off at the lower part of one corner or end adjacent to the carrier, the other corner of the sections being angular in contour, the said sections being constructed and arranged to be respectively moved away from the carrier a greater or less distance according to the thickness of a leaf by the passage thereunder of the said leaf, in combination with elastic means located adjacent to each section for pressing the same toward the carrier.

22. In a fiber cleaning machine, a leaf cleaning or beating device, a carrier or leaf conveyer located in front of the same and adapted to carry the leaves on its upper face, and co-operating means superimposed on and held downward on the carrier in sliding engagement therewith, to press the leaves in contact with the carrier or conveyer, and consisting of a plurality of non-rotative sections, the co-operating means and the carrier being relatively movable, and the said sections being each rounded off at the lower part of one corner or end adjacent to the carrier, the other corner of the sections being angular in contour, the said sections being constructed and arranged to be respectively moved away from the carrier a greater or less distance according to the thickness of a leaf by the passage thereunder of the said leaf, in combination with elastic means located adjacent to each section for pressing the same toward the carrier, and means for increasing or decreasing such elastic pressure.

23. In a fiber cleaning machine, a leaf cleaning or beating device, a carrier or leaf conveyer located in front of the same and adapted to carry the leaves on its upper face, and co-operating means superimposed on and held downward on the carrier in sliding engagement therewith, to press the leaves in contact with the carrier or conveyer, and consisting of a plurality of non-rotative sections, the co-operating means and the carrier being relatively movable, and the said sections having a differential or separate movement or action, and each being rounded off at the lower part of one corner or end adjacent to the carrier, the other corner of the sections being angular in contour, the said sections being constructed and arranged to be respectively moved away from the carrier a greater or less distance according to the thickness of a leaf by the passage thereunder of the said leaf.

24. In a fiber cleaning machine, a leaf cleaning or beating device, a carrier or leaf conveyer located in front of the same and adapted to carry the leaves on its upper face, and co-operating means superimposed on and held downward on the carrier in sliding engagement therewith, to press the leaves in contact with the carrier and consisting of a plurality of sections, the adjacent ends of two sections being located directly in front of, or between the vertical planes of the edges or faces of, the cleaning or beating device, the co-operating means and the carrier being relatively movable, and the said sections being each rounded off at the lower part of one corner or end adjacent to the carrier, the other corner of the sections being angular in contour, the said sections being constructed and arranged to be respectively moved away from the carrier a greater or less distance according to the thickness of a leaf by the passage thereunder of the said leaf.

25. In a fiber cleaning machine, a leaf cleaning or beating device, a carrier or leaf conveyer located in front of the same and adapted to carry the leaves on its upper face, and co-operating means superimposed on and held downward on the carrier in sliding engagement therewith, to press the leaves in contact with the carrier and consisting of a plurality of sections, the adjacent ends of two sections being located directly in front of, or between the vertical planes of the edges or faces of, the cleaning or beating device, the co-operating means and the carrier being relatively movable, and the said sections being each rounded off at the lower part of one corner or end adjacent to the carrier, the other corner of the sections being angular in contour, the said sections being constructed and arranged to be respectively moved away from the carrier a greater or less distance according to the thickness of a leaf by the passage thereunder of the said leaf, in combination with elastic means for pressing the co-operating means toward the carrier.

26. In a fiber cleaning machine, a leaf cleaning or beating device, a carrier or leaf conveyer located in front of the same and adapted to carry the leaves on its upper face, and co-operating means superimposed on and held downward on the carrier in sliding engagement therewith, to press the leaves in contact with the carrier and consisting of a plurality of sections, the adjacent ends of two sections being located directly in front of, or between the vertical planes of the edges or faces of, the cleaning or beating device, the co-operating means and the carrier being relatively movable, and the said sections being each rounded off at the lower part of one corner or end adjacent to the carrier, the other corner of the sections being angular in contour, the said sections being constructed and arranged to be respectively moved away from the carrier a greater or less distance according to the thickness of a leaf by the passage thereunder of the said leaf, in combination with elastic means for pressing the co-operating means toward the carrier, and means for increasing or decreasing such elastic pressure.

27. In a fiber cleaning machine, a leaf cleaning or beating device, a rotary wheel carrier located in front of the same, and adapted to carry the leaves on its upper face and a non-rotative platen consisting of a plurality of sections held downward on the carrier in sliding engagement therewith and forming each a segment of an arc whose center is the same as that of the said wheel, and having a division between the sections located directly in front of, or between the vertical planes of the edges or faces of, the cleaning or beating device, the said sections being each rounded off at the lower part of one corner or end adjacent to the carrier wheel, the other corner of the sections being angular in contour, the said sections being constructed and arranged to be respectively moved away from the carrier a greater or less distance according to the thickness of a leaf by the passage thereunder of the said leaf.

28. In a fiber cleaning machine, a leaf cleaning or beating device, a carrier or leaf conveyer located in front of the same and adapted to carry the leaves on its upper face, and a non-horizontally movable co-operating means superimposed on and held downward on the carrier in sliding engagement therewith, to press the leaves in contact with the carrier, and consisting of a plurality of sections having a division therebetween, the carrier and co-operating means being relatively movable, and the sections having a differential or separate vertical movement caused by the passage thereunder of leaves of different thickness.

29. In a fiber cleaning machine, a leaf cleaning or beating device, a carrier or leaf conveyer located in front of the same and adapted to carry the leaves on its upper face, and a non-horizontally movable co-operating means superimposed on and held downward on the carrier in sliding engagement therewith, to press the leaves in contact with the carrier, and consisting of a plurality of sections having a division therebetween, the carrier and co-operating means being relatively movable, and the sections having a differential or separate vertical movement caused by the passage thereunder of leaves of different thickness, in combination with elastic means for pressing the co-operating means toward the carrier.

30. In a fiber cleaning machine, a leaf cleaning or beating device, a carrier or leaf conveyer located in front of the same and adapted to carry the leaves on its upper face, and a non-horizontally movable co-operating means superimposed on and held downward on the carrier in sliding engagement therewith, to press the leaves in contact with the carrier, and consisting of a plurality of sections having a division therebetween located directly in front of, or between the vertical planes of the faces or edges of, the cleaning or beating device, the carrier and co-operating means being relatively movable, and the sections having a differential or separate vertical movement caused by the passage thereunder of leaves of different thickness.

31. In a fiber cleaning machine, a leaf cleaning or beating device, a carrier or leaf conveyer located in front of the same and adapted to carry the leaves on its upper face, and a non-horizontally movable co-operating means superimposed on and held downward on the carrier in sliding engagement therewith, to press the leaves in contact with the carrier, and consisting of a plurality of sections having a division therebetween located directly in front of, or between the vertical planes of the faces or edges of, the cleaning or beating device, the carrier and co-operating means being relatively movable, and the sections having a differential or separate vertical movement caused by the passage thereunder of leaves of different thickness, in combination with elastic means for pressing the co-operating means toward the carrier.

32. In a fiber cleaning machine, a leaf cleaning or beating device, a rotary wheel carrier or leaf conveyer located in front of the same, and a platen consisting of a plurality of sections forming each a segment of an arc whose center is the same as that of the said wheel, and having a division between the sections, the carrier wheel and platen being relatively movable, and the said sections having a differential or separate movement or action at said division.

33. In a fiber cleaning machine, a leaf cleaning or beating device, a rotary wheel carrier or leaf conveyer located in front of the same, and a platen consisting of a plurality of sections forming each a segment of an arc whose center is the same as that of the said wheel, and having a division between the sections, the carrier wheel and platen being relatively movable, and the said sections having a differential or separate movement or action at said division, in combination with elastic means for pressing the platen toward the carrier.

34. In a fiber cleaning machine, a leaf cleaning or beating device, a carrier or leaf conveyer located in front of the same and adapted to carry the leaves on its upper face, and co-operating means superimposed on and held downward on the carrier in sliding engagement therewith, to press the leaves in contact with the carrier, and consisting of a plurality of sections having a division therebetween, the co-operating means and the carrier being relatively movable, and the said sections having a differential or separate movement or action at said division caused by the passage thereunder of leaves of different thickness.

35. In a fiber cleaning machine, a leaf cleaning or beating device, a carrier or leaf conveyer located in front of the same and adapted to carry the leaves on its upper face, and co-operating means superimposed on and held downward on the carrier in sliding engagement therewith, to press the leaves in contact with the carrier, and consisting of a plurality of sections having a division therebetween, the co-operating means and the carrier being relatively movable, and the said sections having a differential or separate movement or action at said division caused by the passage thereunder of leaves of different thickness, in combination with elastic means for pressing the co-operating means toward the carrier.

36. In a fiber cleaning machine, a leaf cleaning or beating device, a rotary wheel carrier or leaf conveyer located in front of the same, and a platen consisting of a plurality of sections forming each a segment of an arc whose center is the same as that of the said wheel, and having a division between the sections located directly in front of or in the vertical planes of the faces or edges of the cleaning or beating device, the carrier wheel and platen being relatively movable, and the said sections having a differential or separate movement or action at said division.

37. In a fiber cleaning machine, a leaf cleaning or beating device, a rotary wheel carrier or leaf conveyer located in front of the same, and a platen consisting of a plurality of sections forming each a segment of an arc whose center is the same as that of the said wheel, and having a division between the sections located directly in front of or in the vertical planes of the faces or edges of the cleaning or beating device, the carrier wheel and platen being relatively movable, and the said sections having a differential or separate movement or action at said division, in combination with elastic means for pressing the platen toward the carrier.

38. In a fiber cleaning machine, a leaf cleaning or beating device, a carrier or leaf conveyer located in front of the same and adapted to carry the leaves on its upper face, and co-operating means superimposed on and held downward on the carrier in sliding engagement therewith, to press the leaves in contact with the carrier, and consisting of a plurality of sections having a division therebetween located directly in front of, or between the vertical planes of the faces or edges of, the cleaning or beating device, the co-operating means and the carrier being relatively movable, and the said sections having a differential or separate movement or action at said division caused by the passage thereunder of leaves of different thickness.

39. In a fiber cleaning machine, a leaf cleaning or beating device, a carrier or leaf conveyer located in front of the same and adapted to carry the leaves on its upper face, and co-operating means superimposed on and held downward on the carrier in sliding engagement therewith, to press the leaves in contact with the carrier, and consisting of a plurality of sections having a division therebetween located directly in front of, or between the vertical planes of the faces or edges of, the cleaning or beating device, the co-operating means and the carrier being relatively movable, and the said sections having a differential or separate movement or action at said division caused by the passage thereunder of leaves of different thickness, in combination with elastic means for pressing the co-operating means toward the carrier.

40. In a fiber cleaning machine, a leaf cleaning or beating device, a gripping device consisting of a carrier or leaf conveyer located in front of the same, and adapted to carry the leaves on its upper face and co-operating means consisting of a plurality of sections superimposed and held in sliding engagement on the carrier, and each having a differential or separate movement or action caused by the passage thereunder of leaves of different thickness, a plurality of divisions between the sections being located directly in front of, or between the vertical planes of the faces or edges of, the cleaning or beating device, and each being constructed and arranged to coact with and to work in the plane of the said carrier.

41. In a fiber cleaning machine, a leaf cleaning or beating device, a gripping device consisting of a carrier or leaf conveyer located in front of the same, and adapted to carry the leaves on its upper face and co-operating means consisting of a plurality of sections superimposed and held in sliding engagement on the carrier, and each having a differential or separate movement or action caused by the passage thereunder of leaves of different thickness, a plurality of divisions between the sections being located directly in front of, or between the vertical planes of the faces or edges of, the cleaning or beating device, and each being constructed and arranged to coact with and to work in the plane of the said carrier, in combination with elastic means for pressing the co-operating means toward the carrier.

42. In a fiber cleaning machine, a leaf cleaning or beating device, a rotary wheel carrier or leaf conveyer located in front of the same, and adapted to carry the leaves on its upper face and a platen consisting of a plurality of sections held downward on the carrier in sliding engagement therewith and forming each a segment of an arc whose center is the same as that of the said wheel, and each having a differential or separate movement or action caused by the passage thereunder of leaves of different thickness, a plurality of divisions between the sections being located directly in front of, or between the vertical planes of the faces or edges of, the cleaning or beating device, and each being constructed and arranged to coact with and to work in the plane of the said carrier.

43. In a fiber cleaning machine, a leaf cleaning or beating device, a rotary wheel carrier or leaf conveyer located in front of the same, and adapted to carry the leaves on its upper face and a platen consisting of a plurality of sections held downward on the carrier in sliding engagement therewith and forming each a segment of an arc whose center is the same as that of the said wheel, and each having a differential or separate movement or action caused by the passage thereunder of leaves of different thickness, a plurality of divisions between the sections being located directly in front of, or between the vertical planes of the faces or edges of, the cleaning or beating device, and each being constructed and arranged to coact with and to work in the plane of the said carrier, in combination with elastic means for pressing the co-operating means toward the carrier.

44. In a fiber cleaning machine, a leaf cleaning or beating device, a carrier or leaf conveyer located in front of the same and adapted to carry the leaves on its upper face, a platen superimposed on and held downward on the carrier in sliding engagement therewith, to press the leaves in contact with the carrier, and working in the plane of the carrier, and consisting of a plurality of sections having a plurality of divisions between the sections located directly in front of, or between the vertical planes of the faces or edges of, the cleaning or beating device, the said sections having a differential or separate movement or action at each division, caused by the passage thereunder of leaves of different thickness.

45. In a fiber cleaning machine, a leaf cleaning or beating device, a carrier or leaf conveyer located in front of the same and adapted to carry the leaves on its upper face, a platen superimposed on and held downward on the carrier in sliding engagement therewith, to press the leaves in contact with the carrier, and working in the plane of the carrier, and consisting of a plurality of sections having a plurality of divisions between the sections located directly in front of, or between the vertical planes of the faces or edges of, the cleaning or beating device, the said sections having a differential or separate movement or action at each division caused by the passage thereunder of leaves of different thickness, in combination with elastic means for pressing the platen toward the carrier.

46. In a fiber cleaning machine, a leaf cleaning or beating device, a gripping device consisting of a carrier or leaf conveyer adapted to carry the leaves on its upper face, and a non-rotative co-operating means held downward on the carrier in sliding engagement therewith and consisting of a plurality of superimposed sections each having respectively a differential or separate movement or action caused by the passage thereunder of leaves of different thickness, and constructed and arranged to coact with and work in the plane of the said carrier, and elastic means to press the two parts of the gripping device toward each other located directly in front of, or between the vertical planes of the faces or edges of, the cleaning or beating device.

47. In a fiber cleaning machine, a leaf cleaning or beating device, a gripping device consisting of a carrier or leaf conveyer adapted to carry the leaves on its upper face, and a non-rotative co-operating means held downward on the carrier in sliding engagement therewith and consisting of a plurality of superimposed sections each having respectively a differential or separate movement or action caused by the passage thereunder of leaves of different thickness, and constructed and arranged to coact with and to work in the plane of the said carrier, and elastic means to press the two parts of the gripping device toward each other located directly in front of, or between the vertical planes of the faces or edges of, the cleaning or beating device, and means for increasing or decreasing such elastic pressure.

48. In a fiber cleaning machine, a leaf cleaning or beating device, a gripping device consisting of a carrier or leaf conveyer adapted to carry the leaves on its upper face, and co-operating means held downward on the carrier in sliding engagement therewith and having a vertical movement only, and constructed and arranged to coact with and work in the plane of the said carrier, the said co-operating means consisting of a plurality of sections superimposed on and held downward on the carrier in sliding engagement therewith, to press the leaves in contact with the carrier, and each having respectively a differential or separate movement or action caused by the passage thereunder of leaves of different thickness, and elastic means to press the two parts of the gripping device toward each other located directly in front of, or between the vertical planes of the faces or edges of, the cleaning or beating device.

49. In a fiber cleaning machine, a leaf cleaning or beating device, a gripping device consisting of a carrier or leaf conveyer, and a co-operating means consisting of a plurality of devices superimposed on and held downward on the carrier in sliding engagement therewith, to press the leaves in contact with the carrier, and each having respectively a differential or separate movement or action caused by the passage thereunder of leaves of different thickness, and elastic means to press the two parts of the gripping device toward each other located directly in front of, or between the vertical planes of the face or edge of, the cleaning or beating device, the carrier and co-operating means being relatively movable.

50. In a fiber cleaning machine, a leaf cleaning or beating device, a gripping device consisting of a carrier or leaf conveyer and adapted to carry the leaves on its upper face, and a non-rotative co-operating means consisting of a plurality of devices superimposed on and held downward on the carrier in sliding engagement therewith, to press the leaves in contact with the carrier and constructed and arranged to coact with and work in the plane of the said carrier when moved by the passage thereunder of leaves of different thickness, and elastic means to press the two parts of the gripping device toward each other located adjacent to the said superimposed devices and directly in front of, or between the vertical planes of the faces or edges of, the cleaning or beating device.

51. In a fiber cleaning machine, a leaf cleaning or beating device, a gripping device consisting of a carrier or leaf conveyer and adapted to carry the leaves on its upper face, and a non-rotative co-operating means consisting of a plurality of devices superimposed on and held downward on the carrier in sliding engagement therewith, to press the leaves in contact with the carrier and constructed and arranged to coact with and work in the plane of the said carrier when moved by the passage thereunder of leaves of different thickness, and elastic means to press the two parts of the gripping device toward each other located adjacent to the said superimposed devices and directly in front of, or between the vertical planes of the faces or edges of, the cleaning or beating device, in combination with means for increasing or decreasing such elastic pressure.

52. In a fiber cleaning machine, a leaf cleaning or beating device, a gripping device consisting of a carrier or leaf conveyer, and co-operating means having a vertical movement only, and constructed and arranged to coact with and work in the plane of the said carrier, and held downward on the carrier in sliding engagement therewith, to press the leaves in contact with the carrier, the said co-operating means consisting of a plurality of sections, each having respectively a differential or separate movement caused by the passage thereunder of leaves of different thickness, and a plurality of elastic means to press the two parts of the gripping device toward each other, one positioned near each one of a pair of adjacent ends of sections located directly in front of, or between the vertical planes of the faces or edges of, the cleaning or beating device.

53. In a fiber cleaning machine, a leaf cleaning or beating device, a gripping device consisting of a carrier or leaf conveyer adapted to carry the leaves on its upper face, and a co-operating means consisting of a plurality of devices superimposed on and held downward on the carrier in sliding engagement therewith, to press the leaves in contact with the carrier, and constructed and arranged to coact with and work in the plane of the said carrier, and a plurality of elastic means to press the two parts of the gripping device toward each other located adjacent to the said superimposed devices and directly in front of, or between the vertical planes of the faces or edges of, the cleaning or beating device.

54. In a fiber cleaning machine, the combination with a leaf cleaning or beating device, and a rotary wheel carrier for moving the leaf to be treated, and adapted to carry the leaves on its upper face of a platen consisting of a plurality of sections held downward on the carrier in sliding engagement therewith and forming each a segment of an arc whose center is the same as that of the said wheel, each of said segments having elastic means for pressing it toward the wheel carrier when moved by the passage thereunder of leaves of different thickness, a plurality of said elastic means being located directly in front of, or between the vertical planes of the faces or edges of, the cleaning or beating device.

55. In a fiber cleaning machine, the combination with a leaf cleaning or beating device, and a rotary wheel carrier for moving the leaf to be treated, of a platen consisting of a plurality of sections forming each a segment of an arc whose center is the same as that of said wheel, each of the said segments having elastic means for pressing it toward the wheel carrier when moved by the passage thereunder of leaves of different thickness, a plurality of said elastic means being located directly in front of, or between the vertical planes of the faces or edges of, the cleaning or beating device, and means for increasing or decreasing such elastic pressure.

56. In a fiber cleaning machine, a leaf cleaning or beating device, a carrier or leaf conveyer having a longitudinally grooved face located in front of the same, a platen superimposed on the carrier or conveyer and consisting of a plurality of sections having a division between the sections located directly in front of or in the vertical planes of the faces or edges of the cleaning or beating device, the carrier or conveyer and platen being relatively movable, the said parts or sections having a differential or separate movement or action at said division.

57. In a fiber cleaning machine, a leaf cleaning or beating device, a carrier or leaf conveyer having a longitudinally grooved face located in front of the same, a platen superimposed on the carrier or conveyer and consisting of a plurality of sections having a division between the sections located directly in front of or in the vertical planes of the faces or edges of the cleaning or beating device, the carrier or conveyer and platen being relatively movable, the said parts or sections having a differential or separate movement or action at said division, in combination with elastic means located adjacent to each part or section for pressing the same toward the carrier.

58. In a fiber cleaning machine, a leaf cleaning or beating device, a carrier or leaf conveyer having a longitudinally grooved face located in front of the same, and co-operating means superimposed on and held downward on the carrier in sliding engagement therewith, to press the leaves in contact with the carrier, and consisting of a plurality of sections having a division therebetween, the co-operating means and the carrier being relatively movable, and the said sections having a differential or separate movement or action at said division, caused by the passage thereunder of leaves of different thickness.

59. In a fiber cleaning machine, a leaf cleaning or beating device, a carrier or leaf conveyer having a longitudinally grooved face located in front of the same, and co-operating means superimposed on and held downward on the carrier in sliding engagement therewith, to press the leaves in contact with the carrier, and consisting of a plurality of sections having a division therebetween, the co-operating means and the carrier being relatively movable, and the said sections having a differential or separate movement or action at said division, caused by the passage thereunder of leaves of different thickness, in combination with elastic means for pressing the same toward the carrier.

60. In a fiber cleaning machine, a leaf cleaning or beating device, a carrier or leaf conveyer located in front of the same and adapted to carry the leaves on its upper face, a platen superimposed on and held downward on the carrier in sliding engagement therewith, to press the leaves in contact with the carrier, and working in the plane of the carrier, and consisting of a plurality of elastic sections located directly in front of, or between the vertical planes of the faces or edges of, the cleaning or beating device, the said sections having a differential or separate movement or action at each division caused by the passage thereunder of leaves of different thickness.

61. In a fiber cleaning machine, a leaf cleaning or beating device, a carrier or leaf conveyer located in front of the same and adapted to carry the leaves on its upper face, a platen superimposed on and held downward on the carrier in sliding engagement therewith, to press the leaves in contact with the carrier, and working in the plane of the carrier, and consisting of a plurality of sections located directly in front of, or between the vertical planes of the faces or edges of, the cleaning or beating device, the said sections having a differential or separate movement or action at each division caused by the passage thereunder of leaves of different thickness, in combination with a plurality of elastic means for pressing the same toward the carrier also located directly in front of, or between the vertical planes of the faces or edges of, the cleaning or beating device.

62. In a fiber cleaning machine, a leaf cleaning or beating device, a rotary wheel carrier or leaf conveyer located in front of the same, and a platen consisting of a plurality of sections forming each a segment of an arc whose center is the same as that of the said wheel and having a division between the sections located on one side of the cleaning or beating device, and adjacent to the vertical plane of one face or edge of the said cleaning or beating device, the carrier or conveyer and platen being relatively movable, and the said parts or sections having a differential or separate movement or action at said division.

63. In a fiber cleaning machine, a leaf cleaning or beating device, a carrier or leaf conveyer located in front of the same and adapted to carry the leaves on its upper face, and co-operating means superimposed on and held downward on the carrier in sliding engagement therewith, to press the leaves in contact with the carrier, and constructed and arranged to approximately conform in contour with, and to present a practically continuous surface to, and to coact with and to work in the same plane as the carrier, and consisting of a plurality of parts or sections having a division therebetween located on one side of the cleaning or beating device, and adjacent to the vertical plane of one face or edge of the said cleaning or beating device, the carrier and co-operating means being relatively movable, and the said parts or sections having a differential or separate vertical movement or action at said division.

64. In a fiber cleaning machine, a leaf cleaning or beating device, a carrier or leaf conveyer located in front of the same and adapted to carry the leaves on its upper face, and co-operating means superimposed on and held downward on the carrier in sliding engagement therewith, to press the leaves in contact with the carrier, and constructed and arranged to approximately conform in contour with, and to present a practically continuous surface to and to coact with and to work in the same plane as the carrier, and consisting of a plurality of parts or sections having a division therebetween located on one side of the cleaning or beating device, and adjacent to the vertical plane of one face or edge of the said cleaning or beating device, the carrier and co-operating means being relatively movable, and the said parts or sections having a differential or separate vertical movement or action at said division, in combination with elastic means for pressing the co-operating means toward the carrier.

65. In a fiber cleaning machine, a leaf cleaning or beating device, a carrier or leaf conveyer located in front of the same and adapted to carry the leaves on its upper face, and co-operating means superimposed on and held downward on the carrier in sliding engagement therewith, to press the leaves in contact with the carrier, and constructed and arranged to approximately conform in contour with and to work in the same plane as the carrier, and consisting of a plurality of parts or sections having a division therebetween located on one side of the cleaning or beating device, and adjacent to the vertical plane of one face or edge of the said cleaning or beating device, the carrier and co-operating means being relatively movable, and the said parts or sections having a differential or separate vertical movement or action at said division, in combination with elastic means for pressing the co-operating means toward the carrier, and means for increasing or decreasing such elastic pressure.

66. In a fiber cleaning machine, a leaf cleaning or beating device, a rotary carrier or leaf conveyer located in front of the same and adapted to carry the leaves on its upper face, and non-rotary co-operating means superimposed on and held downward on the carrier in sliding engagement therewith, to press the leaves in contact with the carrier, and constructed and arranged to approximately conform in contour with and to work in the same plane as the carrier, and consisting of a plurality of parts or sections having a division therebetween located on one side of the cleaning or beating device, and adjacent to the vertical plane of one face or edge of the said cleaning or beating device, the said parts or sections having a differential or separate movement or action at said division.

67. In a fiber cleaning machine, a leaf cleaning or beating device, a carrier or leaf conveyer located in front of the same, and co-operating means superimposed on the carrier and consisting of a plurality of parts or sections, the adjacent ends of two sections being located on one side of the cleaning or beating device, and adjacent to the vertical plane of one face or edge of the said cleaning or beating device, said ends being constructed and arranged to engage each other with a friction movement and to work with a differential action.

68. In a fiber cleaning machine, a leaf cleaning or beating device, a carrier or leaf conveyer located in front of the same, and co-operating means superimposed on the carrier and consisting of a plurality of parts or sections, the adjacent ends of two sections being located on one side of the cleaning or beating device, and adjacent to the vertical plane of one face or edge of the said cleaning or beating device, said ends being constructed and arranged to engage each other with a friction movement, in combination with elastic means for pressing the co-operating means toward the carrier.

69. In a fiber cleaning machine, a leaf cleaning or beating device, a carrier or leaf conveyer located in front of the same, and co-operating means superimposed on the carrier and consisting of a plurality of parts or sections, the adjacent ends of two sections being located on one side of the cleaning or beating device, and adjacent to the vertical plane of one face or edge of the said cleaning or beating device, said ends being constructed and arranged to engage each other with a friction movement, in combination with elastic means for pressing the co-operating means toward the carrier, and means for increasing or decreasing such elastic pressure.

70. In a fiber cleaning machine, a leaf cleaning or beating device, a rotary wheel carrier or leaf conveyer located in front of the same, and a platen consisting of a plurality of sections forming each a segment of an arc whose center is the same as that of the said wheel, and having a division between the sections located on one side of the cleaning or beating device, and adjacent to the vertical plane of one face or edge of the said cleaning or beating device, the said section ends being constructed and arranged to engage each other with a friction movement.

71. In a fiber cleaning machine, a leaf cleaning or beating device, a rotary wheel carrier or leaf conveyer located in front of the same, and a platen consisting of a plurality of sections forming each a segment of an arc whose center is the same as that of the said wheel, and having a division between the sections located on one side of the cleaning or beating device, and adjacent to the vertical plane of one face or edge of the said cleaning or beating device, the said section ends being constructed and arranged to engage each other with a friction movement, in combination with elastic means for pressing the platen toward the carrier.

72. In a fiber cleaning machine, a leaf cleaning or beating device, a carrier or leaf conveyer located in front of the same and adapted to carry the leaves on its upper face, and co-operating means superimposed on and held downward on the carrier in sliding engagement therewith, to press the leaves in contact with the carrier, and consisting of a plurality of sections, the adjacent ends of two sections being located on one side of the cleaning or beating device, and adjacent to the vertical plane of one face or edge of the said cleaning or beating device, the co-operating means and the carrier being relatively movable, and the said sections being each rounded off at the lower part of one corner or end adjacent to the carrier, the other corner of the sections being angular in contour, the said sections being constructed and arranged to be respectively moved away from the carrier a greater or less distance according to the thickness of a leaf by the passage thereunder of the said leaf.

73. In a fiber cleaning machine, a leaf cleaning or beating device, a carrier or leaf conveyer located in front of the same and adapted to carry the leaves on its upper face, and co-operating means superimposed on and held downward on the carrier in sliding engagement therewith, to press the leaves in contact with the carrier, and consisting of a plurality of sections, the adjacent ends of two sections being located on one side of the cleaning or beating device, and adjacent to the vertical plane of one face or edge of the said cleaning or beating device, the co-operating means and the carrier being relatively movable, and the said sections being each rounded off at the lower part of one corner or end adjacent to the carrier, the other corner of the sections being angular in contour, the said sections being constructed and arranged to be respectively moved away from the carrier a greater or less distance according to the thickness of a leaf by the passage thereunder of the said leaf, in combination with elastic means for pressing the co-operating means toward the carrier or conveyer.

74. In a fiber cleaning machine, a leaf cleaning or beating device, a carrier or leaf conveyer located in front of the same and adapted to carry the leaves on its upper face, and co-operating means superimposed on and held downward on the carrier in sliding engagement therewith, to press the leaves in contact with the carrier, and consisting of a plurality of sections, the adjacent ends of two sections being located on one side of the cleaning or beating device, and adjacent to the vertical plane of one face or edge of the said cleaning or beating device, the co-operating means and the carrier being relatively movable, and the said sections being each rounded off at the lower part of one corner or end adjacent to the carrier, the other corner of the sections being angular in contour, the said sections being constructed and arranged to be respectively moved away from the carrier a greater or less distance according to the thickness of a leaf by the passage thereunder of the said leaf, in combination with elastic means for pressing the co-operating means toward the carrier, and means for increasing or decreasing such elastic pressure.

75. In a fiber cleaning machine, a leaf cleaning or beating device, a rotary wheel carrier located in front of the same, and adapted to carry the leaves on its upper face and a non-rotative platen consisting of a plurality of sections held downward on the carrier in sliding engagement therewith and forming each a segment of an arc whose center is the same as that of the said wheel, and having a division between the sections located on one side of the cleaning or beating device, and adjacent to the vertical plane of one face or edge of the said cleaning or beating device, the said sections being each rounded off at the lower part of one corner or end adjacent to the carrier wheel, the other corner of the sections being angular in contour, the said sections being constructed and arranged to be respectively moved away from the carrier a greater or less distance according to the thickness of a leaf by the passage thereunder of the said leaf.

76. In a fiber cleaning machine, a leaf cleaning or beating device, a carrier or leaf conveyer located in front of the same and adapted to carry the leaves on its upper face, and a non-horizontally movable co-operating means superimposed on and held downward on the carrier in sliding engagement therewith, to press the leaves in contact with the carrier, and consisting of a plurality of sections having a division therebetween located on one side of the cleaning or beating device, and adjacent to the vertical plane of one face or edge of the said cleaning or beating device, the carrier and co-operating means being relatively movable, and the sections having a differential or separate vertical movement caused by the passage thereunder of leaves of different thickness.

77. In a fiber cleaning machine, a leaf cleaning or beating device, a carrier or leaf conveyer located in front of the same and adapted to carry the leaves on its upper face, and a non-horizontally movable co-operating means superimposed on and held downward on the carrier in sliding engagement therewith, to press the leaves in contact with the carrier, and consisting of a plurality of sections having a division therebetween located on one side of the cleaning or beating device, and adjacent to the vertical plane of one face or edge of the said cleaning or beating device, the carrier and co-operating means being relatively movable, and the sections having a differential or separate vertical movement caused by the passage thereunder of leaves of different thickness, in combination with elastic means for pressing the co-operating means toward the carrier.

78. In a fiber cleaning machine, a leaf cleaning or beating device, a rotary wheel carrier or leaf conveyer located in front of the same, and a platen consisting of a plurality of sections forming each a segment of an arc whose center is the same as that of the said wheel, and having a division between the sections located on one side of the cleaning or beating device, and adjacent to the vertical plane of one face or edge of the said cleaning or beating device, the carrier wheel and platen being relatively movable, the said sections having a differential or separate movement or action at said division.

79. In a fiber cleaning machine, a leaf cleaning or beating device, a rotary wheel carrier or leaf conveyer located in front of the same, and a platen consisting of a plurality of sections forming each a segment of an arc whose center is the same as that of the said wheel, and having a division between the sections located on one side of the cleaning or beating device, and adjacent to the vertical plane of one face or edge of the said cleaning or beating device, the carrier wheel and platen being relatively movable, the said sections having a differential or separate movement or action at said division, in combination with elastic means for pressing the platen toward the carrier.

80. In a fiber cleaning machine, a leaf cleaning or beating device, a carrier or leaf conveyer located in front of the same and adapted to carry the leaves on its upper face, and co-operating means superimposed on and held downward on the carrier in sliding engagement therewith, to press the leaves in contact with the carrier, and consisting of a plurality of sections having a division therebetween located on one side of the cleaning or beating device, and adjacent to the vertical plane of one face or edge of the said cleaning or beating device, the co-operating means and the carrier being relatively movable, and the said sections having a differential or separate movement or action at said division caused by the passage thereunder of leaves of different thickness.

81. In a fiber cleaning machine, a leaf cleaning or beating device, a carrier or leaf conveyer located in front of the same and adapted to carry the leaves on its upper face, and co-operating means superimposed on and held downward on the carrier in sliding engagement therewith, to press the leaves in contact with the carrier, and consisting of a plurality of sections having a division therebetween located on one side of the cleaning or beating device, and adjacent to the verplane of one face or edge of the said cleaning or beating device, the co-operating means and the carrier being relatively movable, and the said sections having a differential or separate movement or action at said division caused by the passage thereunder of leaves of different thickness, in combination with elastic means for pressing the co-operating means toward the carrier.

82. In a fiber cleaning machine, a leaf cleaning or beating device, a gripping device consisting of a carrier or leaf conveyer, adapted to carry the leaves on its upper face and a non-rotative co-operating means held downward on this carrier in sliding engagement therewith, and consisting of a plurality of superimposed sections, each having respectively a differential or separate movement or action caused by the passage thereunder of leaves of different thickness, and constructed and arranged to coact with and work in the plane of the said carrier, and elastic means to press the two parts of the gripping device toward each other located on one side of the cleaning or beating device, and adjacent to the vertical plane of one face or edge of the said cleaning or beating device.

83. In a fiber cleaning machine, a leaf cleaning or beating device, a gripping device consisting of a carrier or leaf conveyer, adapted to carry the leaves on its upper face and a non-rotative co-operating means held downward on this carrier in sliding engagement therewith and consisting of a plurality of superimposed sections, each having respectively a differential or separate movement or action caused by the passage thereunder of leaves of different thickness, and constructed and arranged to coact with and work in the plane of the said carrier, and elastic means to press the two parts of the gripping device toward each other located on one side of the cleaning or beating device, and adjacent to the vertical plane of one face or edge of the said cleaning or beating device, and means for increasing or decreasing such elastic pressure.

84. In a fiber cleaning machine, a leaf cleaning or beating device, a gripping device consisting of a carrier or leaf conveyer, adapted to carry the leaves on its upper face and co-operating means held downward on this carrier in sliding engagement therewith and having an upward movement only, and constructed and arranged to coact with and work in the plane of the said carrier, the said co-operating means consisting of a plurality of sections, each having respectively a differential or separate movement or action caused by the passage thereunder of leaves of different thickness, and elastic means to press the two parts of the gripping device toward each other located on one side of the cleaning or beating device, and adjacent to the vertical plane of one face or edge of the said cleaning or beating device.

85. In a fiber cleaning machine, a leaf cleaning or beating device, a gripping device consisting of a carrier or leaf conveyer, adapted to carry the leaves on its upper face and co-operating means held downward on this carrier in sliding engagement therewith and consisting of plurality of superimposed sections, each having respectively a differential or separate movement or action caused by the passage thereunder of leaves of different thickness, and elastic means to press the two parts of the gripping device toward each other located on one side of the cleaning or beating device, and adjacent to the vertical plane of one face or edge of the said cleaning or beating device, the carrier and co-operating means being relatively movable.

86. In a fiber cleaning machine, a leaf cleaning or beating device, a gripping device consisting of a carrier or leaf conveyer, adapted to carry the leaves on its upper face and a non-rotative co-operating means held downward on this carrier in sliding engagement therewith and consisting of a plurality of superimposed devices constructed and arranged to coact with and work in the plane of the said carrier when moved by the passage thereunder of leaves of different thickness, and elastic means to press the two parts of the gripping device toward each other located adjacent to the said superimposed devices and on one side of the cleaning or beating device, and adjacent to the vertical plane of one face or edge of the said cleaning or beating device.

87. In a fiber cleaning machine, a leaf cleaning or beating device, a gripping device consisting of a carrier or leaf conveyer, adapted to carry the leaves on its upper face and a non-rotative co-operating means consisting of a plurality of superimposed devices, held downward on this carrier in sliding engagement therewith and each having respectively a differential or separate movement or action caused by the passage thereunder of leaves of different thickness, and elastic means to press the two parts of the gripping device toward each other located adjacent to the said superimposed devices and on one side of the cleaning or beating device, and adjacent to the vertical plane of one face or edge of the said cleaning or beating device.

88. In a fiber cleaning machine, a leaf cleaning or beating device, a gripping device consisting of a carrier or leaf conveyer adapted to carry the leaves on its upper face and a plurality of superimposed devices held downward on the carrier in sliding engagement therewith and each having respectively a differential or separate movement or action caused by the passage thereunder of leaves of different thickness, and constructed and arranged to coact with and work in the plane of the said carrier, and a plurality of elastic means to press the two parts of the gripping device toward each other located near the sides of the cleaning or beating device, and adjacent to the vertical planes of the faces or edges of the said cleaning or beating device.

89. In a fiber cleaning machine, the combination with a leaf cleaning or beating device, and a rotary wheel carrier for moving the leaf to be treated, adapted to carry the leaves on its upper face of a platen consisting of a plurality of sections held downward on the carrier in sliding engagement therewith and forming each a segment of an arc whose center is the same as that of said wheel, each of said segments having elastic means for pressing it toward the wheel carrier when moved by the passage thereunder of leaves of different thickness, a plurality of said elastic means being located near the sides of the cleaning or beating device, and adjacent to the vertical planes of the faces or edges of the said cleaning or beating device.

90. In a fiber cleaning machine, the combination with a leaf cleaning or beating device, and a rotary wheel carrier for moving the leaf to be treated, adapted to carry the leaves on its upper face of a platen consisting of a plurality of sections held downward on the carrier in sliding engagement therewith and forming each a segment of an arc whose center is the same as that of said wheel, each of said segments having elastic means for pressing it toward the wheel carrier when moved by the passage thereunder of leaves of different thickness, a plurality of said elastic means being located near the sides of the cleaning or beating device, and adjacent to the vertical planes of the faces or edges of the said cleaning or beating device.

91. In a fiber cleaning machine, a cleaning or beating device, a gripping device consisting of a carrier or conveyer, and adapted to carry the leaves on its upper face and a series of superimposed devices held downward on the carrier in sliding engagement therewith and each having respectively a differential movement or action caused by the passage thereunder of leaves of different thickness, and being constructed and arranged to coact with and work in the plane of the said carrier, and a plurality of elastic means to press the two parts of the gripping device toward each other, one located adjacent to each side of the cleaning or beating device, and adjacent to the vertical plane of one face or edge of the said cleaning or beating device.

92. In a fiber cleaning machine, a cleaning or beating device, a carrier or leaf conveyer having a longitudinally grooved face located in front of the same and adapted to carry the leaves on its upper face, a platen superimposed on and held downward on the carrier in sliding engagement therewith, to press the leaves in contact with the carrier, and consisting of a plurality of sections having a division between the sections located on one side of the cleaning or beating device, and adjacent to the vertical plane of one face or edge of the said cleaning or beating device, the carrier and platen being relatively movable, the said parts or sections having a differential or separate movement at such division.

93. In a fiber cleaning machine, a cleaning or beating device, a carrier or leaf conveyer having a longitudinally grooved face located in front of the same and adapted to carry the leaves on its upper face, a platen superimposed on and held downward on the carrier in sliding engagement therewith, to press the leaves in contact with the carrier, and consisting of a plurality of sections having a division between the sections located on one side of the cleaning or beating device, and adjacent to the vertical plane of one face or edge of the said cleaning or beating device, the carrier and platen being relatively movable, the said parts or sections having a differential or separate movement at such division, in combination with elastic means located adjacent to each part or section for pressing the same toward the carrier.

94. In a fiber cleaning machine, a leaf cleaning or beating device, a carrier or leaf conveyer located in front of the same and adapted to carry the leaves on its upper face, a platen superimposed on and held downward on the carrier in sliding engagement therewith, to press the leaves in contact with the carrier, and working in the plane of the carrier, and consisting of a plurality of sections having a plurality of divisions between the sections, a pair of adjacent ends of sections being located on each side of the cleaning or beating device, and adjacent to the vertical planes of the faces or edges of the said cleaning or beating device, the said sections having a differential or separate movement or action at each division caused by the passage thereunder of leaves of different thickness.

95. In a fiber cleaning machine, a leaf cleaning or beating device, a carrier or leaf conveyer located in front of the same and adapted to carry the leaves on its upper face, a platen superimposed on and held downward on the carrier in sliding engagement therewith, to press the leaves in contact with the carrier, and working in the plane of the carrier, and consisting of a plurality of sections having a plurality of divisions between the sections, a pair of adjacent ends of sections being located on each side of the cleaning or beating device, and adjacent to the vertical planes of the faces or edges of the said cleaning or beating device, the said sections having a differential or separate movement or action at each division caused by the passage thereunder of leaves of different thickness, in combination with elastic means for pressing the platen toward the carrier.

In testimony of the foregoing specification I do hereby sign the same in the city of New York county and State of New York, this first day of June 1906.

JOSEPH GARCIA.

Witnesses:
ROB. SCHWARZ,
J. ODELL FOWLER.